Sept. 28, 1971            E. LAURITZEN            3,608,268
METHOD FOR PRODUCING THIN-WALLED, COLLAPSIBLE
CONTAINERS OR PACKAGES
Filed June 3, 1968            2 Sheets-Sheet 1

INVENTOR.
Erick Lauritzen
BY
De Lio and Montgomery
ATTORNEYS

INVENTOR.
Erick Lauritzen
BY
De Lio and Montgomery
ATTORNEYS

United States Patent Office 3,608,268
Patented Sept. 28, 1971

3,608,268
METHOD FOR PRODUCING THIN-WALLED, COLLAPSIBLE CONTAINERS OR PACKAGES
Erik Lauritzen, Gentofte, Denmark, assignor to Niels Bay-Schmith, Mosebakken, Virum, Denmark
Filed June 3, 1968, Ser. No. 733,926
Claims priority, application Denmark, June 7, 1967, 2,988/67
Int. Cl. B65b 43/00; B29c 17/00
U.S. Cl. 53—29                    7 Claims

ABSTRACT OF THE DISCLOSURE

A method for producing thin-walled, collapsible packages each having a protruding, relatively thick-walled tubular body for holding a hypodermic needle by: (a) inflating an intermediate part of a stiff tubular blank of thermoplastic material in heated condition to a small wall-thickness, usually less than $\frac{1}{100}$ inch, while the adjacent blank parts are not inflated to any substantial degree, (b) cutting the inflated part transversely, (c) inserting the needle portion of the hypodermic into the adjacent blank part, and (d) heat-sealing the opposite ends of the package. The degree of inflation and the shape of the resulting package may be controlled by inflating in a mould cavity, or by heating the blank only along the longitudinal parts which are to be inflated.

---

Figure 1:
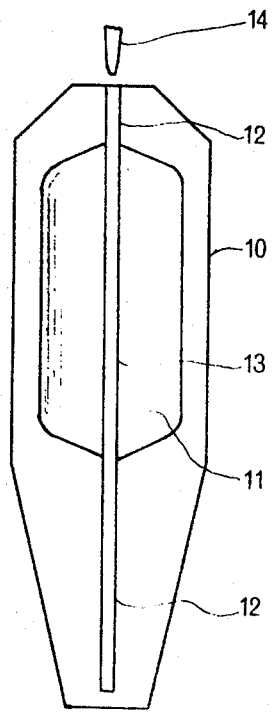

This invention relates to a method for producing from thermoplastic material thin-walled, collapsible containers or packages having at least one protruding, relatively thick-walled tubular body.

It is known to produce such bag-like plastic containers which are so thin-walled that they do not have a stable form, and which is each provided with one or more hoses or tubular members. These known bag-like plastic containers are normally produced by sealing together the edge portions of two sheets of plastic which may be produced by extrusion, which may, if desired, be followed by a drawing process. By the known processes the said hoses or tubular members are made as separate parts which are fastened to the thin-walled container, for example by heat sealing or glueing, when this container has been made as described above. Thus the known processes for producing plastic containers of the type described is relatively complicated, and therefore the production of the containers involves relatively high costs which to some extent has prevented an extensive use of the said containers for packaging purposes and as hospital articles of the disposable type.

One object of the invention is to provide a method for producing containers of the said type enabling a more simple and thus also a cheaper production of the above-mentioned bag-like containers permitting a more extensive use thereof as disposable containers or packages than hitherto.

Another object of the invention is to provide a method for producing containers of the type described in such a way that the tubular body or bodies is formed integrally with the bag-like part of the container.

A further object of the invention is to provide a simple method for producing urine bags.

A still further object of the invention is to provide a simple method for producing tubes for containing pasty substances and the like packages or containers, such as feeding bottles of the disposable type.

The invention has also for its object to provide a simple method for producing a package especially suited for the packaging of hypodermic needles or the like.

The method according to the invention for producing from thermoplastic material thin-walled, collapsible containers each having integral therewith two protruding, relatively thick-walled tubular bodies comprises inflating in heated condition an intermediate part of a tubular blank of said thermoplastic material to the desired small wall-thickness and to a substantially higher degree than that to which the adjacent blank parts are inflated. In this manner a bag-like container or package having a protruding tubular body, such as a spout, a hose or a pipe stub at each end may be produced in a single operation from a tubular blank which may be produced in a manner known per se, for example by extrusion. Admittedly it is known to produce relatively thick-walled, form-stable containers having protruding tubular portions at their ends, such as stiff ampoules, by inflating a tubular blank moderately. However, for some unknown reason it has not been realized previously that a similar method may advantageously be used for the production of thin-walled, bag-like containers or packages having tubular bodies at their ends.

The tubular bodies of a bag-like container or package produced by the method according to the invention may for example serve as inlet and outlet, respectively. A bag of the said type may be used e.g. as an urine bag for collecting urine from patients who for some reason cannot discharge urine in the normal way. In such case the tubular inlet of the bag may, if desired, by means of a hose be connected to a catheter introduced into the body of the patient. Through the outlet of the bag, which may be provided with a closing member of some kind, the urine bag may be emptied periodically while the inlet is still connected to the catheter.

By inflating in accordance with the invention tubular blanks which have just left an extruder and thus are hot and uncontaminated the resulting bag-like containers are substantially less contaminated than corresponding containers which are produced by connecting separate parts as described above. This is of substantial importance when the containers are to be used as urine bags or for similar purposes.

The invention also envisages a method for a rational and relatively cheap production of bag-like containers or packages each having one protruding tubular body. Thus the invention also relates to a method for producing from thermoplastic material thin-walled, collapsible containers each having integral therewith a protruding, relatively thick-walled tubular body, said method comprising inflating in heated condition an intermediate part of a tubular blank of said thermoplastic material to the desired small wall-thickness and to a substantially higher degree than that to which the adjacent blank parts are inflated, cutting the said inflated containers transversely at the inflated intermediate part and sealing said part along the cut edges. This sealing operation may, if desired, take place when a substance or an object to be packaged has been introduced into the container or package. In this manner from each tubular blank a number of containers or packages being twice the number of inflated intermediate parts of the blank may be produced.

According to the invention the protruding tubular body may be shaped as a neck or a spout, which may, if desired, be provided with external threads or other fastening means for a detachable closure member. A container of this type provided with a screw cap is suited for use as a tube. Due to the fact that the wall-thickness of the container is so small that the container is not form-stable but collapsible, the tube will only to a small extent be inclined to assume its original shape when by discharging the contents of the tube the end of same is compressed or rolled up. Thus a tube made by the method according to the invention does not have the tendency of the conventional plastic tubes to suck air into the pasty substance contained in the tube. A complete emptying of the tube is made difficult by such tendency to suck in air, and air sucked into the contents of the tube may cause uncontrollable squirting by discharge of the said contents. If the spout of a container produced in accordance with the invention in the said manner is provided with a bead and the screw cap is replaced by a nipple, the container may be used as a feeding bottle of the disposable type. If the inflated part is not transversely cut as mentioned above a container having two closable spouts are obtained, and in such case the spouts may be used as a filling spout and a discharge spout, respectively. For those skilled in the art if will become obvious that containers of the type produced by the method according to the invention may be used for several other purposes than those mentioned above.

According to the invention the protruding tubular body may be made several times longer than the inflated container part integrally connected therewith, and the method according to the invention may comprise sealing the tubular body at its free end, whereby containers suitable for packaging hypodermic needles and the like may be produced. A container of this type having a short bag-like part being relatively spacious and merging into a relatively thick-walled and stiff tubular part which is relatively long and has a relatively small cross section is well suited for packaging a hypodermic needle or a cannula because the relatively stiff tubular body may afford the necessary protection to the needle itself against bending stresses and other types of mechanical load, and normally the needle is not able to perforate the surrounding relatively thick-walled tubular body accidentally. The thin-walled bag-like part of the package, which by said use is intended to enclose the mounting member of the needle or cannula, is able to sufficiently protect said mounting member which is relatively sturdy. The bag-like part may easily be sealed, e.g. by heat-sealing, when the needle or cannula has been placed in the package, and when the needle or cannula is to be used, the package may be opened without any difficulties by tearing the bag-like part.

The wall-thickness to which the intermediate part of the tubular blank is to be inflated in order to obtain the collapsible, bag-like container or package desired depends in each case on the material from which the blank is produced. Normally, however, the said intermediate part is preferably inflated to a wall-thickness smaller than $\frac{1}{100}$ of an inch.

Preferred thermoplastics for use in connection with the method according to the invention are polyolefines and copolymers thereof, as such materials have been found very suitable for inflating to the above-mentioned small wall-thickness. An especially suitable and presently most preferred material is a ionomer sold by E. I. du Pont de Nemours and Co. under the trade name "Surlyn A."

When using the method according to the invention the tubular blank is preferably inflated in a mould cavity whereby the container shape desired is most easily obtained, and, furthermore, a suitable modification of the outer shape of said tubular bodies constituting the free ends of the blank may, if desired, easily be obtained when a mould is used. The modification desired normally depends on the intended use of the containers or packages being produced. When the blank is inflated in a mould, this mould is preferably placed in connection with an extruder, because the blank extruded and still being hot may then be inflated without further heating. It is, however, also possible to allow the extruder blank to cool after extruding, and, according to the invention, before inflation the blank may then be heated only along the longitudinal parts which are to be inflated. In this case the use of a mould when inflating the blank may be avoided, because only the heated longitudinal parts of the sample will expand substantially during inflation. A uniform heating and thus a uniform expanding of the longitudinal parts of the blank may, if desired, be obtained by rotating the blank when inflating the same.

In the following specification various embodiments of the method according to the invention will be more fully described. This description should be interpreted as examples rather than in a limiting sense, and reference is made to the drawings in which FIG. 1 shows one half of a blow mould with a tubular blank placed therein, FIG. 2 an urine bag produced by the method according to the invention by using the mould shown in FIG. 1, FIG. 3 another embodiment of an urine bag which may be produced by using the method according to the invention, FIG. 4 a cross section of a third embodiment of an urine bag which may be produced by the method according to the invention, FIG. 5 a side-view of a blank inflated in accordance with the invention and intended for the production of plastic tubes for containing for example tooth paste and similar substances, FIG. 6 a side-view of a blank inflated by the method according to the invention and intended for the production of packages for needles to be used in connection with injection syringes, FIG. 7 a needle package produced from the blank shown in FIG. 6 and containing a hypodermic needle, FIG. 8 a side-view of a blank inflated by using the method according to the invention and intended for the production of bag-like feeding bottles of the disposable type, and FIG. 9 shows a syringe ampoule, which may be produced by using the method according to the invention.

FIG. 1 shows one half 10 of a blow mould having a mould cavity 11 preferably being shaped as a body of revolution. At its ends the mould cavity 11 merges into cylindrical channels 12, the cross section of which substantially corresponds to the cross section of the tubular plastic blank 13 in connection with which the mould is intended to be used.

The blank 13 may for example be fed directly from an extruder, not shown, and thus be in a plastic condition when it is placed in the blow mould. Alternatively the blank 13 may be a cold tube section which is placed in the mould after having been heated. When the blank 13 has been placed in the mould in such a manner that it extends through the channels 12 as shown in FIG. 1, the two halves of the blow mould are closed together, and by blowing air or gas into the blank 13 through one end thereof by means of a blow tube 14 said blank is inflated to film-thickness within the mould cavity. e.g. preferably so as to obtain a wall-thickness smaller than $\frac{1}{100}$ inch.

Figure 2:
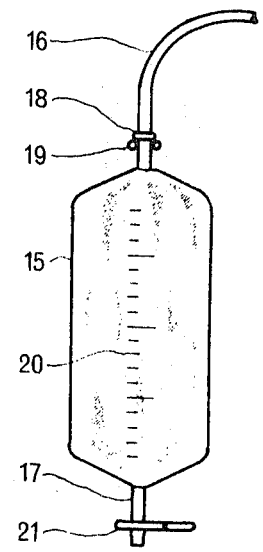

FIG. 2 shows an urine storage container or an urine bag 15 which has been produced in a mould of the type shown in FIG. 1 and in the above described manner. The urine bag consists of a bag-like container having a wall-thickness which is smaller than $\frac{1}{100}$ inch and which is therefore very flexible and collapsible like a conventional bag made from film of plastic, and at its ends the said container as an inlet tube 16 and an outlet tube 17 being integral with the bag and having a wall-thickness which is substantially the same as the wall-thickness of the tubular blank 13 and which is thus substantially bigger than the wall-thickness of the bag itself. The inlet tube may be formed with a bead 18 enabling the urine bag to be suspended by means of a fork-shaped member 19 as shown in FIG. 2. A bead may also be formed on the outlet tube 17, if desired, so as to enable the said tube to be mounted in a similar fork-shaped member whereby the urine bag may be maintained in a tight condition. Thereby a volume scale 20, which may be placed or printed directly on the urine bag 15 or on a separate plate placed behind or at one side of the bag, may be more accurately read. The outlet tube 17 may be provided with a hose clip 21 or another closing member by means of which it is possible to periodically discharge the urine or another liquid collected in the bag 15.

Figure 4:
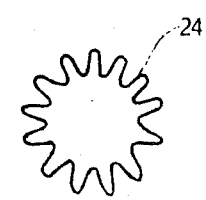
Figure 3:
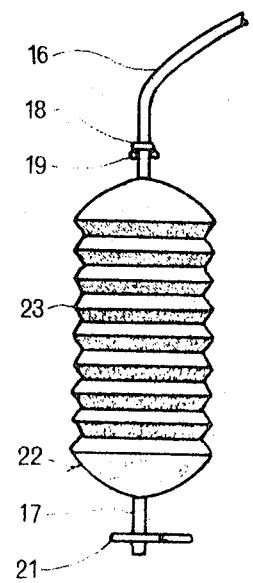

FIG. 3 shows a further embodiment of a plastic container which is provided with tubes or hoses and which may be produced by the method according to the invention in a blow mould of the type shown in FIG. 1. The container or urine bag 22 differs from the container shown in FIG. 2 by being provided with circumferentially extending corrugations 23 whereby the bag is formed like a bellows or a concertina. The bag may alternatively be provided with axially extending corrugations 24 in which case the bag will have a cross section as shown in FIG. 4. The corrugations 23 and 24 have the effect that the bag, which is collapsible per se, may be folded up in a more neat and uniform manner.

Figure 5:
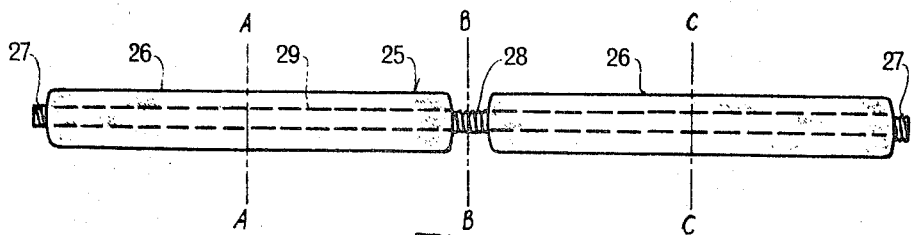

FIG. 5 shows a tubular blank 25 which is made from thermoplastic plastic, and which has been inflated in a blow mould along two longitudinal sections to such a wall-thickness that said longitudinal sections obtain the character of easily collapsible and foldable bags. The end sections 27 and the middle section 28 of the blank have an outer diameter being substantially the same as that of the original blank 29 being indicated with dotted lines on the drawing before inflation of the blank. During inflation the sections 27 and 28 have, however, been provided with external threads.

If the inflated blank 25 is cut transversely along the lines A—A, B—B and C—C, tube-shaped packages having threaded discharge spouts which may be closed by a conventional screw cap may be obtained. When the pasty mass which is to be packaged in the tubes has been filled in the same, the tubes may be closed along their cut edges, e.g. by heat-sealing. Due to its small wall-thickness a tube produced in this way is substantially more suitable than plastic tubes produced by prior art methods, because the first mentioned tube when being compressed does not have the same marked tendency to reassume its uncompressed shape as the known tubes, and therefore, during use the suction of air into the packaged product and the disadvantages in connection therewith may be avoided.

Figure 6:
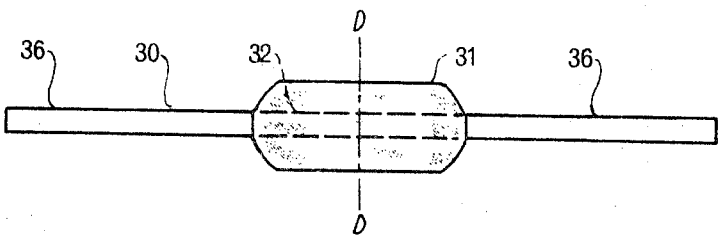
Figure 7:
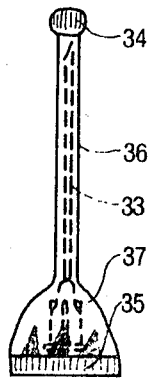

The blank 30 shown in FIG. 6 is produced by inflating a longitudinal section 31 of a cylindrical tubular blank 32 which is partly indicated by dotted lines. The blank 30 may be inflated in a blow mould. The use of such mould may, however, be avoided if the basic blank 32 is heated uniformly and only along the longitudinal section 31, whereas the temperature of the end sections is kept below the plasticizing temperature of the plastic material. If the blank 30 is cut along the line D—D, a package suitable for packaging a hypodermic needle 33, see FIG. 7, is produced, and such package may be sealed, e.g. by means of heat sealing seams 34 and 35. A needle package of this type comprises a tubular part 36 having a stiffness sufficient to afford a suitable protection of the needle member itself, and an enlarged bag-like part 37 having a small wall-thickness. This bag-like part surrounds the needle mounting member which is less sensitive to mechanical load, and may relatively easily be torn when the needle is to be used and the package therefore should be opened.

Figure 8:
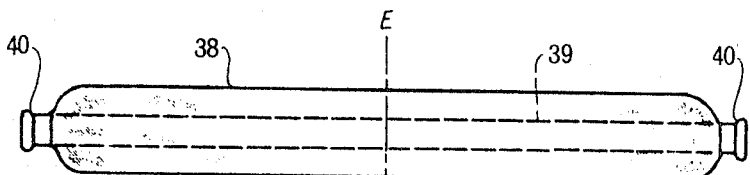
Figure 9:
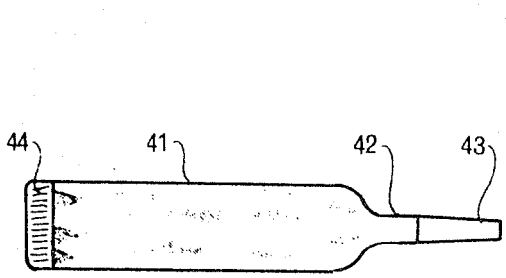

FIG. 8 shows a blank 38 produced by inflating a cylindrical, tubular blank 39 which is indicated with dotted lines on the drawing. Apart from its free ends being shaped as necks the blank 39 has been inflated to film-thickness along the whole length thereof. If the inflated blank 39 is cut along the line E—E and possibly after filling, in a contents, is closed along the cut edges, e.g. by heat-sealing, the blank 38 is converted into two packages or containers each of which is suitable for use as feeding bottle of the disposable type. The necks at the free ends of the blank 39, which will then become the necks of the bottles, may be provided with an external bead 40 for fastening of a nipple. Before closing, for example milk powder may be filled in the bottle which may be sold with this contents so that before use the customer only has to pour water into the bottle to a certain level indicated by a mark.

FIG. 9 shows an a ampoule adapted to contain an injectable medium and having a thin-walled, bag-like container-part 41 merging at one end into a tubular, relatively thick-walled neck 42 ending in a conical needle seat 43. The ampoule is sealed as well at the free end of the needle seat 43 as at the opposite end of the ampoule, which may have been closed by a heat-sealing seam 44 made after the filling in of an injectable medium. When such an ampoule is to be used, a hypodermic needle is mounted on the seat 43, the free end of which is simultaneously perforated. This may for example be obtained by using a needle pointed at both ends.

An ampoule of the type shown may advantageously be produced by using the method according to the invention, a blank of the type shown in FIGS. 6 and 8 being inflated whereby the free ends of said blank is shaped as a needle seat 43. If a such inflated blank is cut at the middle and sealed along its cut edges, two ampoules of the type described are provided. It is also possible to produce an ampoule from an inflated blank of the type described without cutting said blank. In this case the pipe stub at one end of the blank may be used as a guiding member to be received in the piston of an injection syringe whereas the pipe stub at the other end may be shaped as a needle seat as previously described.

It will easily be understood by those skilled in the art that by means of the method according to the invention a large number of containers different from those shown on the drawings may be made, provided that these containers are thin-walled and bag-like and at one of or both of their ends are provided with a pipe stub, a tube, a hose or a similar tubular body having a relatively great wall-thickness. Furthermore it should be noted that in each blow mould it is possible to produce a single container as shown in FIG. 1, two containers as shown in FIGS. 5 and 6, four containers as shown in FIG. 5 or any other even number of containers. As indicated above it is also possible to produce said containers without using a blow mould. In this case the tubular blanks from which the containers are inflated should be heated to a temperature above plasticizing temperature of the thermoplastic material only along the longitudinal sections for which inflation is desired. Although the containers produced are normally shaped as bodies of revolution and produced from circularly cylindrical, tubular blanks having a uniform wall-thickness along the whole length thereof, the containers may be inflated to any other shape and the tubular blank may be given a wall-thickness varying correspondingly along its periphery. Finally it should be mentioned that by using the method according to the invention the containers may, if desired, be produced from blanks consisting of two or more layers of plastic whereby the finished containers also consisting of different layers of plastic may be obtained. Thus, for example, by using the method according to the invention it is possible to produce milk packages consisting of two layers of plastic having different colours.

What I claim is:

1. A method of protecting and utilizing a hypodermic needle or the like article, said method comprising (a) inflating in heated condition an intermediate part of a stiff tubular blank of a thermoplastic material so as to provide collapsible, tearable walls of said intermediate part while maintaining the adjacent blank parts substantially uninflated, said blank parts having dimensions effective to receive and protect the needle-like part of the hypodermic needle and said collapsible walls being thin and tearable relative to said adjacent blank parts, (b) transversely cutting said intermediate part so as to provide separate packaging members having a relatively stiff tubular part and a bag-like collapsible part integral therewith, (c) placing one of said articles in each packaging member such that the needle-like part of the article projects into said relatively stiff tubular part and the remaining part of the article is enclosed by said bag-like collapsible part, (d) sealing the opposite ends of each packaging member and (e) removing said article by tearing said tearable portion.

2. A method according to claim 1 wherein said relatively stiff tubular part of step (b) is several times longer than said bag-like collapsible part integrally connected therewith.

3. A method according to claim 1 wherein said tubular blank is heated prior to inflation thereof substantially only along said intermediate part which is to be inflated.

4. A method according to claim 1 wherein said intermediate part of said blank is inflated to a wall-thickness smaller than $1/100$ of an inch.

5. A method according to claim 1 wherein said tubular blank is made from a polyolefine or copolymer thereof.

6. A method according to claim 1 wherein said tubular blank is made from an ionomer.

7. A method according to claim 1 wherein said tubular blank is heated prior to inflation thereof substantially only along said intermediate part which is to be inflated, and said inflating is effected without the use of a blow mold.

References Cited

UNITED STATES PATENTS

| 3,114,455 | 12/1963 | Claisse et al. | 206—43X |
| 2,413,323 | 12/1946 | Hills | 264—Coll. Tube |
| 3,197,532 | 7/1965 | Maass | 264—98 |

FOREIGN PATENTS

| 1,171,388 | 1/1959 | France | 264—B.B. |
| 1,220,563 | 5/1960 | France | 264—94 |

ROBERT F. WHITE, Primary Examiner

T. J. CARVIS, Assistant Examiner

U.S. Cl. X.R.

53—37; 206—43; 264—96, 100, 159